United States Patent Office 2,891,042
Patented June 16, 1959

2,891,042

PROCESS FOR POLYMERIZATION OF ETHYLENE

Albert S. Matlack, Wilmington, Del., assignor to Hercules Powder Company, Wilmington, Del., a corporation of Delaware No Drawing. Application May 27, 1957
Serial No. 661,568

6 Claims. (Cl. 260—94.9)

This invention relates to the polymerization of ethylene under relatively mild conditions of pressure and temperature and, more particularly, to an entirely new type of catalyst system for the polymerization of ethylene under such conditions.

K. Ziegler has described the polymerization of ethylene with organometallic compounds of the metals of group III-A of the periodic table, i.e., organometallic compounds of aluminum, gallium and indium to produce polymers varying in molecular weight from dimers up to the wax range polymers. He has also described the preparation of high molecular weight crystalline polymers by contacting ethylene with a mixture of an organoaluminum compound and a compound of a metal of group IV-B, V-B, VI-B or VIII of the periodic table.

Now in accordance with this invention it has most surprisingly been discovered that ethylene may be polymerized to a high molecular weight crystalline polymer under relatively mild conditions of temperature and pressure by contacting ethylene with one of the metals of the actinide series of metals also called the radioactive metals, as for example, thorium, uranium, etc., the metal being in finely divided form and having a freshly exposed surface in contact with the ethylene. Not only is the process of this invention very effective for the polymerization of ethylene, but the crystalline polymer produced is a more highly saturated polymer than is produced by the prior art processes.

The polymerization of ethylene in accordance with this invention may be carried out in a wide variety of ways. It may be carried out in the presence or absence of an inert organic diluent as reaction medium. Generally, a diluent is used because it simplifies the isolation of the polymer at the end of the polymerization reaction. Any inert liquid organic diluent may be used, as for example, aliphatic hydrocarbons such as hexane, heptane, etc., cycloaliphatic hydrocarbons such as cyclohexane or aromatic hydrocarbons such as benzene, toluene, xylene, etc., or any mixture of such hydrocarbons, halogenated hydrocarbons such as methylene chloride, ethylene chloride, chloroform, carbon tetrachloride, chlorobenzene, etc.

As already mentioned, the radioactive metal to be effective as a catalyst for the polymerization is preferably in a finely divided state and presents a freshly exposed surface to the ethylene with which it is contacted. Such finely divided or activated metals may be obtained by ball milling in an inert atmosphere, atomizing the molten metal into an inert atmosphere, reduction of metal oxide with hydrogen, dissolving away part of an alloy, various means of preparing it in colloidal form, etc. In general, the finely divided metal will have an average particle size varying from about 1 micron or less to about 100 microns and preferably from about 1 micron to about 20 microns. Any desired means may be used for contacting the ethylene with the finely divided metal having an active surface. A particularly effective method of carrying out the process in accordance with this invention is to ball mill the metal in the presence of ethylene, either with or without a diluent. By so doing, a fresh surface of the metal catalyst is continually contacted with the ethylene being polymerized. A polymerization so started may be transferred to another vessel provided with adequate agitation such as one with a high shear agitator. When operating in a ball mill, the metal may be in any desired shape, as for example, strip, foil, flake, etc., which will, of course, be reduced to the desired size during the ball milling operation, but for maximum efficiency it is preferably used in the form of finely divided powder or flake. Another method of operating the process is to atomize the metal into an inert gas which after cooling to about 200° C. or less is passed directly into the ethylene stream or mixture of ethylene and diluent. The process of this invention may be operated either on a batchwise scale or as a continuous operation.

The amount of the metal used as the catalyst may be varied over a wide range from a minor catalytic amount to a large excess and will in general be governed by the type of operation used. Thus, in a ball mill, relatively small amounts may be used, the maximum amount that may be used depending upon the efficiency of the ball mill operation with such larger amounts. On the other hand, larger amounts may be used when the metal is atomized into an inert gas and added to the ethylene stream, etc. Any one of the metals may be used as the catalyst, or a mixture of them may be used. They may also be used in the form of their alloys with mercury or other metals.

The temperature and pressure used for the polymerization process may be varied over a wide range and will largely depend upon the method by which the ethylene is contacted with the surface of the metal. In general, the polymerization will be carried out at room temperature or slightly above, but any temperature within the range of from about —80° C. to about 200° C. may be used, preferably from about 0° C. to about 100° C., and more preferably from about 20° C. to about 60° C. In the same way, while atmospheric pressure or a pressure of only a few pounds may be used, the polymerization may be carried out over a wide range of pressures, but higher pressures do not appreciably alter the course of polymerization and, hence, are not required. In general, it is desirable to operate under anhydrous and anaerobic conditions.

While the actinide metals are excellent catalysts when used alone, cocatalysts or activators may be used, if desired, whereby the rate of polymerization and/or yield may be increased. Exemplary of such cocatalysts or activators are the halogens such as iodine, bromine, etc., hydrogen halides such as hydrogen chloride, hydrogen bromide, etc., and the halides of the metals themselves. Obviously many other variations may be made in the process without departing from the scope of this invention.

The following examples will demonstrate the process of polymerizing ethylene in accordance with this invention. The molecular weight of the polymers produced in these examples is indicated by the reduced specific viscosity (RSV) given for each. By the term "reduced specific viscosity" is meant the $\eta_{sp}/c$ determined on a 0.1% solution of the polymer in decalin, containing 0.1 g. of the polymer per 100 ml. of solution (unless otherwise indicated), at 135° C. Where the melting point of the polymer is given, it is the temperature at which the birefringence due to crystallinity disappears. All parts and percentages are by weight unless otherwise indicated.

*Examples 1 and 2*

In these examples the polymerization was carried out in cylindrical vibratory ball mills which were constructed of stainless steel (analysis: carbon—0.008% max.; Cr—18.00–20.00%; Ni—8.80–10.00%; Mn—2.00% max.) and outfitted with a gas inlet tube and a main opening. The mills were 80% full of 0.5 inch stainless steel balls.

In each case the mill, previously dried for 4 hours at 120° C. was charged with 70 parts of n-heptane which had been dried over sodium and then with the catalyst metal, 2.0 parts of thorium powder being used in Example 1 and 1.4 parts of uranium filings in Example 2. The mill was capped, then twice filled with dry nitrogen and evacuated, and then ethylene was injected to a pressure of 50 p.s.i.g. After 16 hours of milling at room temperature (about 30° C.) the polymer slurry was removed from the mill. The polyethylene was isolated by filtration. The polymer so obtained was purified by dissolving in 1500 parts of boiling xylene, separating the solution from the ash, cooling said solution to precipitate the polymer and again separating the polymer by filtration and then drying for 16 hours at 80° C. in vacuo. The final pressure, yield of polymer obtained in each case and physical properties are tabulated below along with a control run wherein no metal was added as catalyst.

| Example | Catalyst Metal Added | Final Pressure, p. s. i. g. | Percent Conversion | RSV | Melting Point, ° C. |
|---|---|---|---|---|---|
| Control | None | 50 | 0 | | |
| Ex. 1 | Thorium | −10 | 65 | 1.8 | 136 |
| Ex. 2 | Uranium | −3 | 76 | 4.9 | 136 |

The many advantages of the process of this invention will be at once apparent to those skilled in the art. It is a halogen-free catalyst system, hence the problem of mold corrosion encountered on molding the polymer is eliminated. The use of the hazardous, spontaneously inflammable, aluminum alkyls, used in the prior art processes, is avoided. Other advantages lie in the better control that may be had in a one-component catalyst system, less equipment required, less need for blanketing operations with inert gases, etc.

By the term "actinide series of metals" used in this specification and appended claims is meant the elements in the 7th series of the periodic table starting with actinium and including thorium, proactinium, uranium, etc. Authority for the use of the term "actinide series" may be found in the Periodic Table of Deming, General Chemistry, sixth edition, 1952, John Wiley & Sons, Inc., New York, and in the Periodic Table, page 672, of Encyclopedia of Chemical Technology, volume 5, The Interscience Encyclopedia, Inc., New York.

What I claim and desire to protect by Letters Patent is:

1. The process of polymerizing ethylene which comprises contacting ethylene with a freshly exposed surface of a finely divided metal selected from the group consisting of thorium and uranium.

2. The process of claim 1 wherein the metal is thorium.

3. The process of claim 1 wherein the metal is uranium.

4. The process of polymerizing ethylene which comprises ball milling a mixture of ethylene and a finely divided metal selected from the group consisting of thorium and uranium.

5. The process of claim 4 wherein the metal is thorium.

6. The process of claim 4 wherein the metal is uranium.

References Cited in the file of this patent

UNITED STATES PATENTS 2,721,189    Anderson et al. _____ Oct. 18, 1955

FOREIGN PATENTS 534,792    Belgium _____ Jan. 31, 1955

OTHER REFERENCES

High Surface Sodium on Inert Solids (copyright 1953), 19 pages, pages 9–11 relied on), U.S. Industrial Chemicals Company, 120 Broadway, New York 5, New York.